United States Patent
Massarksy

Patent Number: 6,021,417
Date of Patent: Feb. 1, 2000

[54] METHOD OF STIMULATING THE CREATION OF AN ARTIST'S DRAWING OR PAINTING, AND DEVICE FOR ACCOMPLISHING SAME

[75] Inventor: Yefim Massarksy, Newton, Mass.

[73] Assignee: Foto Fantasy, Inc., N.H.

[21] Appl. No.: 08/961,780

[22] Filed: Oct. 31, 1997

[51] Int. Cl.[7] .................................................. G06F 11/00
[52] U.S. Cl. ........................... 707/502; 345/441; 345/348
[58] Field of Search .................... 707/502, 526, 707/530; 345/441, 473, 474, 338, 348

[56] References Cited

U.S. PATENT DOCUMENTS

| | | | |
|---|---|---|---|
| 4,695,142 | 9/1987 | Hold | 355/20 |
| 5,072,246 | 12/1991 | Thayer et al. | 396/2 |
| 5,109,281 | 4/1992 | Kobori et al. | 358/296 |
| 5,196,876 | 3/1993 | Thayer | 396/2 |
| 5,216,755 | 6/1993 | Walker et al. | 345/432 |
| 5,343,386 | 8/1994 | Barber | 364/400 |
| 5,345,313 | 9/1994 | Blank | 348/598 |
| 5,469,536 | 11/1995 | Blank | 345/431 |
| 5,513,991 | 5/1996 | Reynolds et al. | 434/81 |
| 5,539,453 | 7/1996 | David et al. | 348/77 |
| 5,617,138 | 4/1997 | Ito et al. | 348/222 |
| 5,621,868 | 4/1997 | Mizutani et al. | 345/431 |
| 5,647,796 | 7/1997 | Cohen | 463/1 |
| 5,687,304 | 11/1997 | Kiss | 345/419 |
| 5,767,860 | 6/1998 | Zimmer et al. | 345/441 |

*Primary Examiner*—Stephen S. Hong
*Attorney, Agent, or Firm*—Brian M. Dingman

[57] ABSTRACT

A method of simulating the creation of a mock artist's drawing or painting image on a monitor, from an electronically-stored image, comprising translating the electronically-stored image into instructions capable of creating the mock image; generating and displaying on the monitor an icon which simulates drawing or painting the mock image; and using the instructions to move the icon across the monitor, wherein the mock image is created gradually as the icon moves across the monitor, to simulate the process by which an artist may create the mock image. Also disclosed is a device for accomplishing the methods of this invention.

26 Claims, 6 Drawing Sheets

METHOD OF STIMULATING THE CREATION OF AN ARTIST'S DRAWING OR PAINTING, AND DEVICE FOR ACCOMPLISHING SAME

FIELD OF THE INVENTION

This invention relates to a method of simulating the creation of an artist's drawing or painting on a video monitor, and a device for accomplishing the method.

BACKGROUND OF THE INVENTION

Artists often sketch or paint portraits on the street or in storefronts, particularly in tourist areas. The subject or a loved one enjoys the end result, and spectators often enjoy observing the creation of the work. However, this can only happen with a talented, live artist, and a live subject, or perhaps from a photograph.

Photo booths have been used for years to capture images of subjects. Modern photo booths often include fantasy backgrounds which can be inserted into the captured image. Although the result is pleasing, neither the subject nor passers by can observe the process by which the photograph is created. Accordingly, in photo booths there is little entertainment value associated with the creation of the output photograph.

SUMMARY OF THE INVENTION

It is therefore an object of this invention to provide a method of simulating the creation of an artist's drawing or painting.

It is a further object of this invention to provide such a method which is entertaining to both the user and to passers by.

It is a further object of this invention to provide such a method which can be used in a photo booth.

It is a further object of this invention to provide such a method which creates a mock sketch or painting using a computer.

It is a further object of this invention to provide such a method in which the user can select from more than one artist type to create different mock sketches or paintings.

This invention features in one embodiment a method of simulating the creation of a mock artist's drawing or painting image on a monitor, from an electronically-stored image, comprising translating the electronically-stored image into instructions capable of creating the mock image; generating and displaying on the monitor an icon which simulates drawing or painting the mock image; and using the instructions to move the icon across the monitor, wherein the mock image is created gradually as the icon moves across the monitor, to simulate the process by which an artist may create the mock image.

The translating step may include determining a display-parameter value (the grey scale value in the preferred embodiment) of pixels of the electronically-stored image. The translating step may further include dividing the determined values into groups which represent contiguous portions of a digital grey scale spectrum.

The method may further include electronically storing a plurality of display textures for use in creating the mock image. The translating step may include substituting the stored display textures for portions of the electronically-stored image. The using step may include displaying on the monitor the substituted display textures in the areas of the display corresponding to the substituted portions of the electronically-stored image. The method may further include manually sketching a plurality of textures, and electronically storing a plurality of display textures may then include scanning the manually sketched textures into a computer memory.

Displaying on the monitor the substituted display textures may include gradually creating on the monitor the substituted display textures. Gradually creating the substituted display textures may include moving the icon across the monitor in a predetermined movement pattern. The predetermined movement pattern may be accomplished in one area of the display corresponding to the substituted portions of the electronically-stored image at a time. Gradually creating on the monitor the substituted display textures may include creating the display textures along the path on which the icon traverses the monitor, as the icon traverses the monitor.

The step of generating and displaying an icon may include providing and displaying a plurality of drawing icons, and providing a means for a user to select one drawing icon. The instructions capable of creating the mock image may include division of the electronically-stored image into a plurality of separate image areas, each image area corresponding generally to contiguous image areas of approximately the same brightness. Using the instructions to move the icon across the monitor may include moving the icon across the monitor in a predetermined movement pattern. The predetermined movement pattern may be accomplished in the plurality of separate image areas, one image area at a time.

In another embodiment, this invention features a method of simulating the creation of a mock artist's drawing or painting image on a monitor, from an electronically-stored image, comprising: electronically storing a plurality of display textures for use in creating the mock image; translating the electronically-stored image into instructions capable of creating the mock image, including determining a display-parameter value of pixels of the electronically-stored image, and dividing the determined values into groups, in which the groups represent contiguous portions of a display parameter spectrum; and in which the translating step further includes substituting the stored display textures for portions of the electronically-stored image; generating and displaying on the monitor an icon which simulates drawing or painting the mock image; and using the instructions to move the icon across the monitor, wherein the mock image is created gradually as the icon moves across the monitor, to simulate the process by which an artist may create the mock image.

In yet another embodiment, this invention features a method of simulating the creation of a mock artist's drawing or painting image on a monitor, from an electronically-stored image, comprising: electronically storing a plurality of display textures for use in creating the mock image; translating the electronically-stored image into instructions capable of creating the mock image, including determining the grey scale value of pixels of the electronically-stored image, dividing the determined grey scale values into groups, and in which the translating step includes substituting the stored display textures for portions of the electronically-stored image; generating and displaying on the monitor an icon which simulates drawing or painting the mock image; and using the instructions to move the icon across the monitor, wherein the mock image is created gradually as the icon moves across the monitor, to simulate the process by which an artist may create the mock image, including displaying on the monitor the substituted display textures in the areas of the display corresponding to the substituted portions of the electronically-stored image, and in which displaying on the monitor the substituted display textures includes gradually creating on the monitor the substituted display textures, and in which gradually creating the substituted display textures includes moving the icon across the monitor in a predetermined movement pattern, in which the predetermined movement pattern is accomplished in one area of the display corresponding to the substituted portions of the electronically-stored image at a time, and further in which gradually creating on the monitor the substituted display textures includes creating the display textures along the path on which the icon traverses the monitor, as the icon traverses the monitor.

Also featured is a method of simulating the creation of a mock artist's drawing or painting image on a computer monitor, from an electronically-stored image, comprising: translating the electronically-stored image into instructions capable of creating the mock image; using the instructions to gradually create the mock image on the monitor, in separate discrete portions of the monitor one at a time, to simulate the process by which an artist may create the mock image.

This invention further features a photography booth for creating a printed output of a mock artist's drawing or painting image, comprising: a printer; a computer with memory; means for storing a customer-provided image in the computer memory; means for storing a plurality of drawing textures; means for substituting one or more of the stored textures for different areas of the stored image to create an electronic mock artist's drawing or painting image; and means for providing the electronic mock artist's image to the printer, to print the mock artist's image.

In another embodiment, this invention features a photography booth for creating an output of a mock artist's drawing or painting image, comprising: a computer with memory; means for storing a customer-provided image in the computer memory; means for storing a plurality of drawing textures; means for substituting one or more of the stored textures for different areas of the stored image to create an electronic mock artist's drawing or painting image; and means for creating a stored version of the mock artist's image or the electronic mock artist's image on a portable machine-readable memory device, and delivering it to the user as a record of the image.

The booth of this embodiment may further include a hard copy output device, and means for providing the electronic mock artist's image to the output device, to create a hard copy of the mock artist's image. The booth may also further include a monitor, and means for displaying on the monitor a gradual process of creating the mock image, and means for creating a stored version of the gradual process on a portable, machine-readable memory device, and means for dispensing to the user the portable, machine-readable memory device.

The booth may further include means for dispensing to the user the hard copy. The hard copy output device may be a computer printer, an engraver, or an etcher.

BRIEF DESCRIPTION OF THE DRAWINGS

Other objects, features and advantages will occur to those skilled in the art from the following description of a preferred embodiment, and the accompanying drawings, in which.

DESCRIPTION OF THE PREFERRED EMBODIMENT

This invention may be accomplished in a method of simulating the creation of a mock artist's drawing or painting on a computer output device, for example a printer and/or monitor, preferably the monitor of a self-photography booth of the type known in the field. Most basically, the method contemplates the existence of an electronically-stored image to be recreated on the output device in the form of a mock artist's drawing or painting. The image can be captured live with a video camera, or can be a scanned or video-captured image of an existing photograph, or input as an electronic file from a previously-saved electronic image. The type and format of such electronic image is well known in the video field.

In the method of this invention, this electronically-stored image is translated into computer instructions capable of creating the desired displayed and/or printed mock artist's drawing or painting image. An icon is preferably displayed on the monitor on which the mock image is to be created. The instructions are then used to move the icon across the monitor, and the mock image is created gradually following the path followed by the icon, to simulate a sketch or painting created by an artist's hand. The completed mock image may then be printed as a hard copy for the user to save. Alternatively, the mock image can be created by the computer and simply provided as a hard copy output, such as a printed paper or engraved wood or metal piece, and/or an electronically-stored format such as CD ROM, disk, or computer or video tape.

Figure 1:
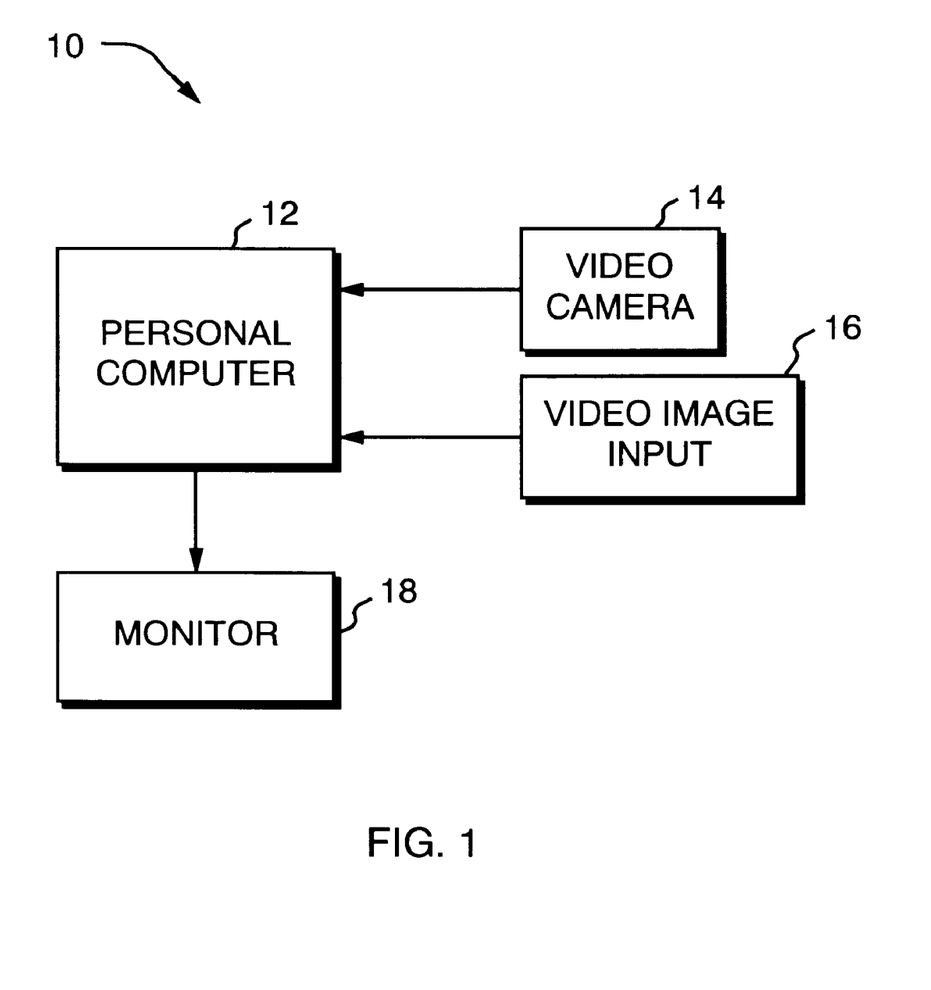
FIG. 1 is a simplified schematic diagram of a system of this invention capable of accomplishing the methods of this invention.

FIG. 1 is a simplified schematic diagram of system 10 of this invention, which may be used to accomplish the methods of this invention. Personal computer 12 has memory, typically in the form of a hard drive or RAM as appropriate depending on the computer and the size of the file. An electronic image to be recreated in this invention is received into the memory. The image may be provided by video camera 14, which can capture either a live image or an image of a photograph placed in front of the video camera, or the image can be input to computer 12 as a digital file 16. Personal computer 12 has a standard video grabber board such as a Flashpoint by Integral Technologies. As explained in more detail below, software resident in computer 12 generates and displays on monitor 18 an icon which is used to simulate the drawing or painting of the mock output image. The software also translates the electronically-stored image into instructions capable of creating the mock image.

These instructions are used to move the icon across the monitor. The image is created gradually in the path which the icon follows, to simulate the drawing or painting of the image by the icon. The icon can take any desired shape, for example an artist's hand with a pencil or paintbrush, or a more fantastic image such as an animal or other object which moves about monitor 18.

Figure 2A:
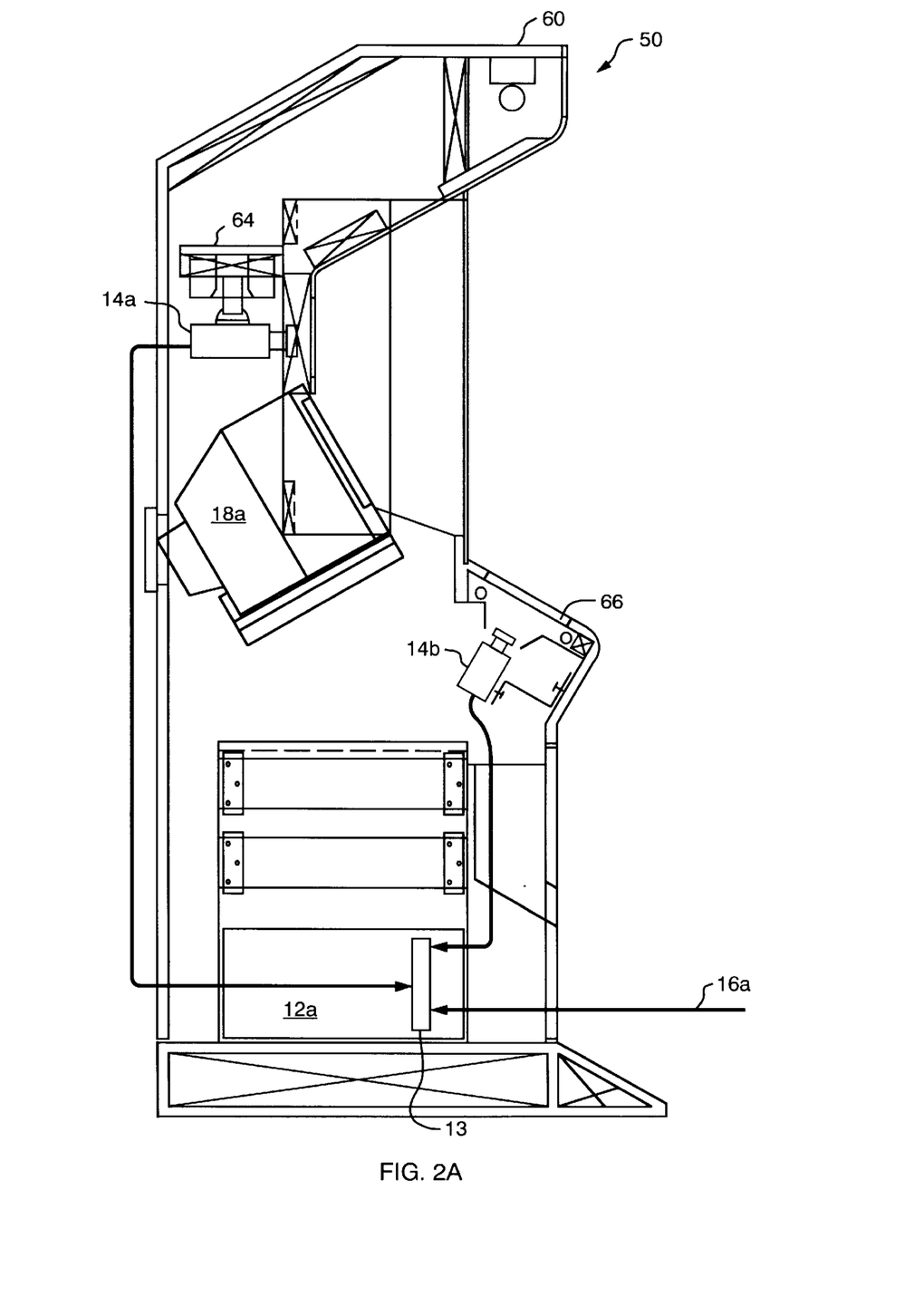
FIG. 2A is a cross sectional schematic view of a photo booth which accomplishes the system of FIG. 1.

The system of FIG. 1 may be accomplished in a free-standing self-photography booth such as booth 50, FIG. 2. Booth 50 includes video camera 14a with positioning device 64 which may be controlled by a user, not shown, standing or sitting in front of camera 14a to capture a live image of the user. Booth 50 is also shown as including second video camera 14b which is pointed at glass plate 66 on which may be placed a photograph which the user desires to have translated into a mock artist's drawing or painting image. It is also possible to include another image input source 16a, which could be accomplished with a modem or other connect device to allow the input of an electronic image file.

The desired video input is routed to video board 13 of personal computer 12a. Software resident in computer 12a directs the creation of the mock artist drawing or painting image on monitor 18a. When the image creation process is complete, the image may be printed out with a standard printer such as a Hewlett Packard laser printer, not shown in the drawing.

Figure 2B:
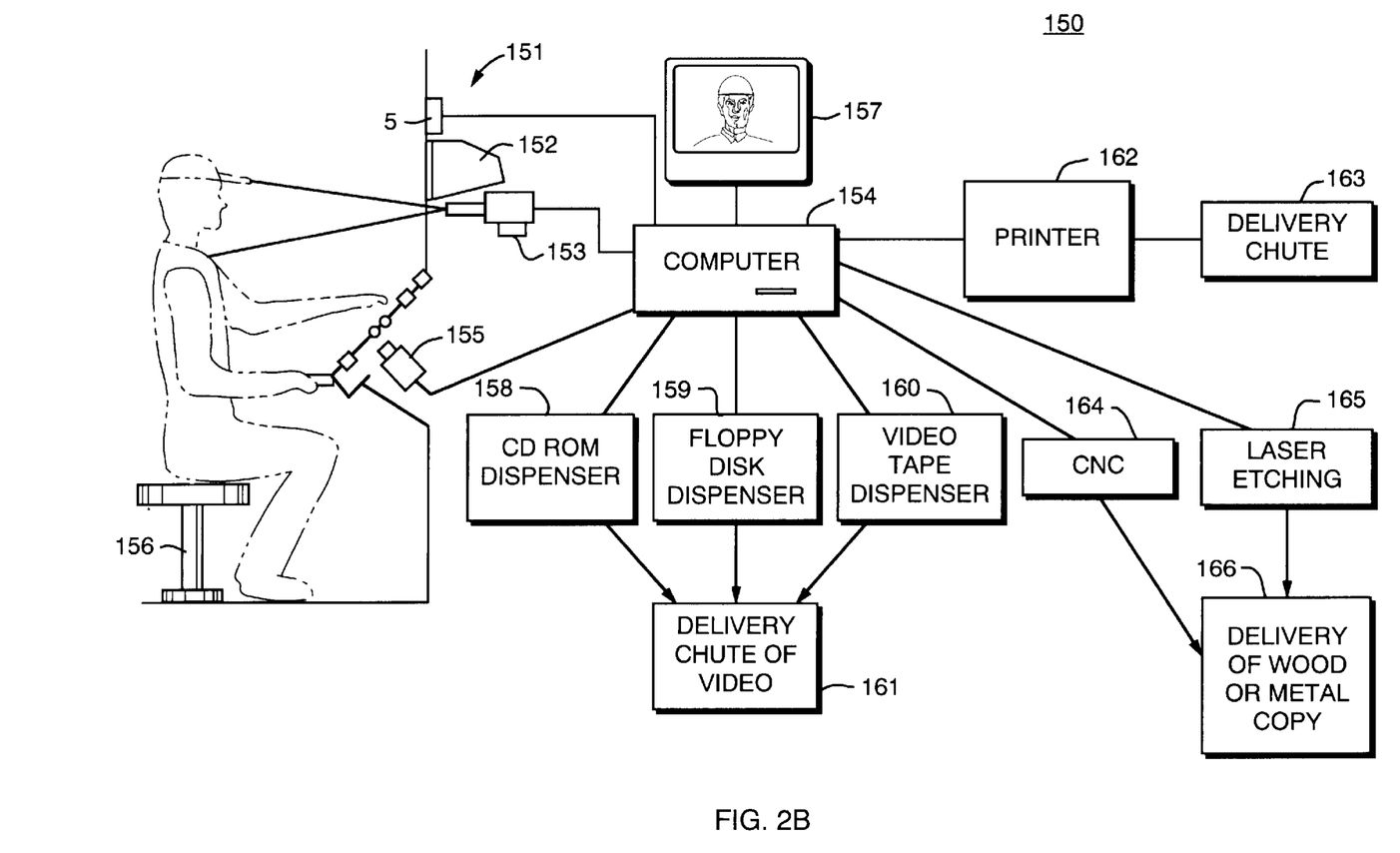
FIG. 2B is a schematic diagram of another photo booth which accomplishes this invention.

FIG. 2B is a schematic diagram of another embodiment of system 150 of this invention, which may be used to practice the method of this invention. Photo booth 151 has user-operated camera position and image selection buttons labelled 1–4, and money input device or credit card device 5 for enabling the system. A user sits on seat 156 and a portrait of the user is captured by video camera 153, whose input is provided to personal computer 154. Second video camera 155 is pointed at a glass plate (not shown) to capture an image of a still photograph, as described above. User monitor 152 displays the appropriate image for viewing by the user, and second monitor 157 displays the same image to others. System 150 includes the provision of a hard copy and/or an electronic copy of the mock image created by the system, and/or a video clip of the process by which the mock image was created, which the user can take with him and play back as desired by the user on a computer or VCR, to entertain the user. These recorded animation sequences can be created and dispensed on any available portable, machine-readable memory device media, such as CD ROM dispenser 158, floppy disk dispenser 159, and video tape dispenser 160, each of which would be delivered through chute 161. Another possibility would be the use of a modem to transmit an electronic file comprising a digital video clip of the image creation process.

System 150 also provides different types of hard copy output of the image created. Printer 162 can deliver a paper copy through chute 163. A copy could alternatively be engraved on a hard material such as wood, metal or plastic by CNC engraver 164, or etched with a device such as a laser etching machine 165, and delivered through chute 166.

Figure 3:
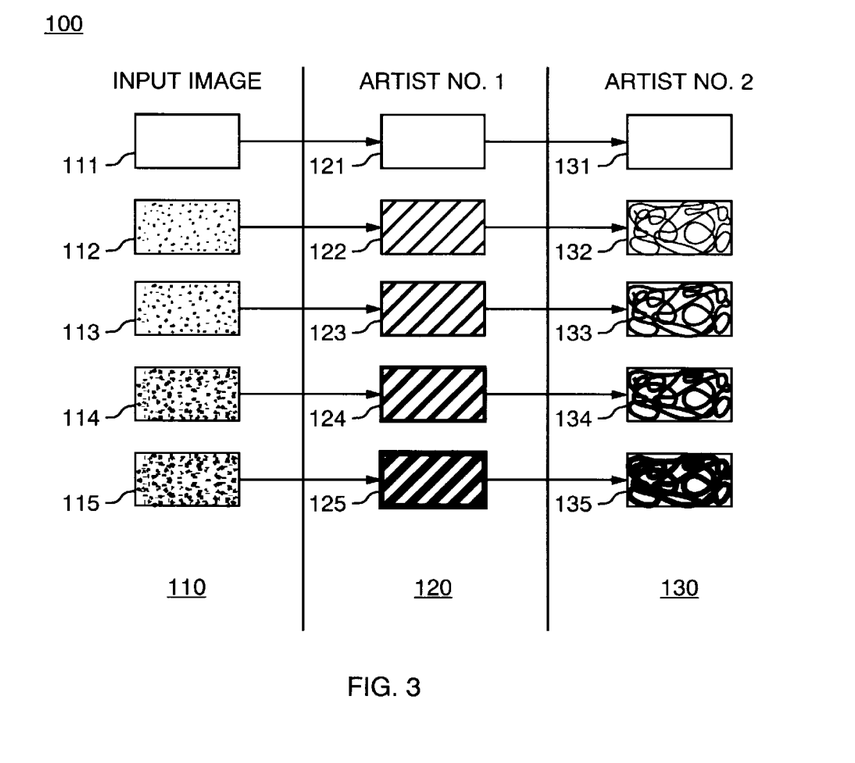
FIG. 3 is exemplary of two different manners of substituting the grey scale value of the input image with textures representative of two different artists, for use in this invention.

The first step of the preferred embodiment of the method of this invention is to translate the electronically-stored image into instructions capable of creating the mock image. This is preferably accomplished as follows. Software resident in the computer, in conjunction with the video board, is enabled to determine the grey scale value of each pixel of the electronically-stored image. One or more display parameters other than grey scale (e.g. hue, RGB value, saturation) can be the parameter of the pixels for which a value is determined and used as set forth below. Grey scale will be used in the following discussion, but such does not limit the invention. The entire grey scale which may be recognized by the video system used has been previously divided into a number of groups. Preferably, these groups each represent contiguous portions of a digital grey scale spectrum. For example, with an eight bit video system, 256 grey scale values are supported. These 256 values can be divided into a number of groups. FIG. 3 displays five groups 111–115 in column 110. The size of, and grey scale values comprising, each group is a design choice, partially driven by the type of mock image output which it is for which a value is desired to create. Column 110 in FIG. 3 is meant to represent grey scale values of increasing darkness from value 111 to value 115. The software then assigns the appropriate grey scale group value to each pixel of the electronically-stored image.

The method of this invention preferably allows for more than one type of artistic style to be used in creating the mock artist's image. This can be accomplished as follows. A number of display textures for each type of mock artist style are input into the personal computer. This may be accomplished by manually sketching such textures, each of which represents a progressively darker drawing or painting area, and/or a particular color for a color output. These different textures are then scanned into a computer and digitized to create instructions that are necessary to accomplish an output on the monitor which is representative of the scanned texture. FIG. 3 illustrates two groups of such scanned textures for two different artist styles, labelled "Artist Number 1" and "Artist Number 2", columns 120 and 130, respectively. The artist number 1 style is accomplished by a series of ever-thicker diagonal lines which create an ever darker shading effect. A similar effect is created in textures 131–135 in column 130 using thicker and/or more closely spaced curved lines and other drawing portions. There are limitless possibilities for the creation of texture areas having different darkness which can be scanned into the computer.

The next step in translating the electronically stored image into instructions capable of creating the mock image is to effectively substitute the stored display textures for the portions of the electronically-stored image having the appropriate grey scale values. This may be accomplished as follows.

Figure 4A:
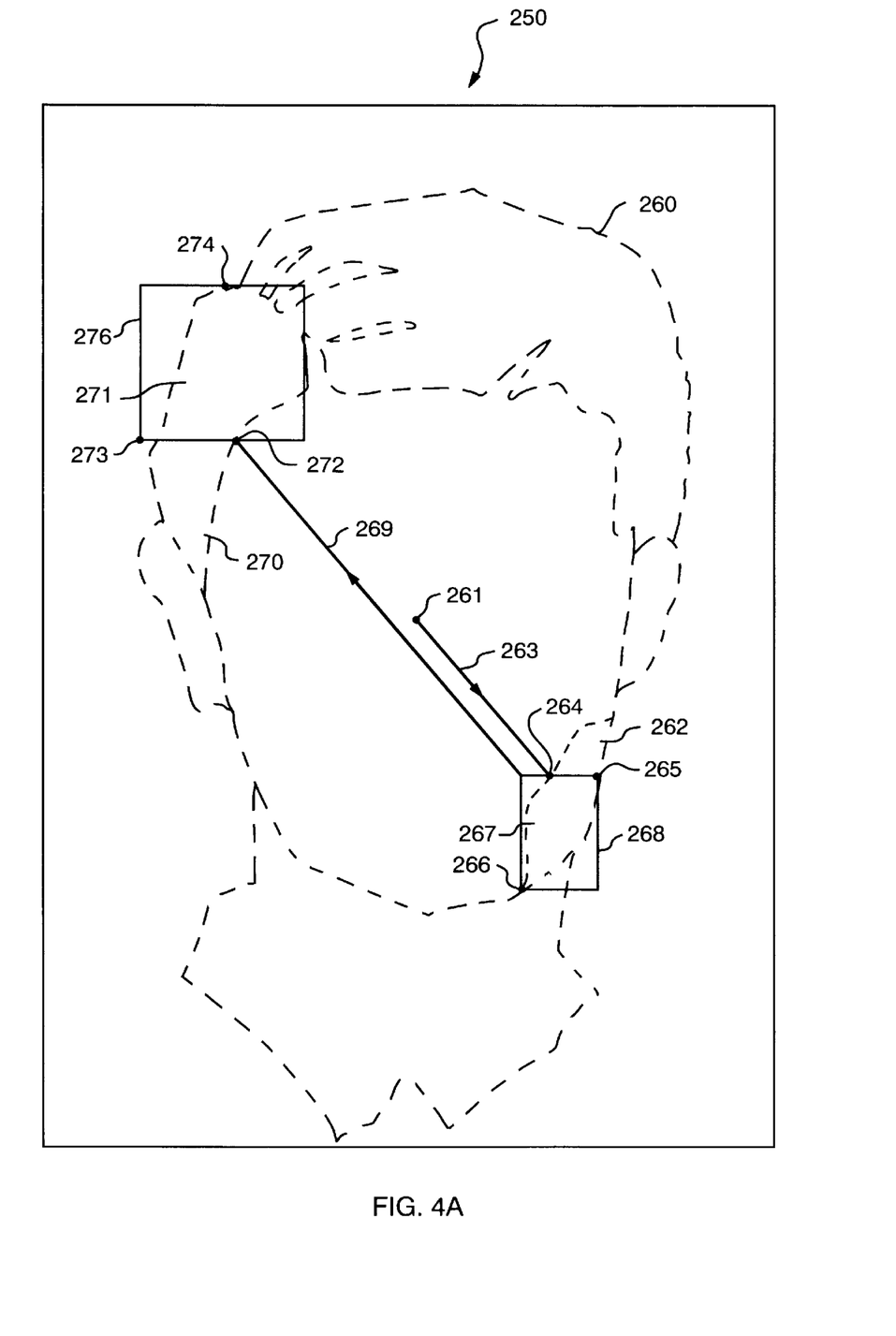
FIG. 4A is a more schematic representation of a portion of a displayed mock image, which is helpful in illustrating the preferred manner in which the image of this invention is created by the method of this invention.

With reference to FIG. 4A, image area 250 bounded by the large rectangle includes image 260 (shown in phantom), which is the outline of a portrait. Image 260 is not the actual image created on the monitor by the method of this invention, but is merely an illustration of a portion of an image which is useful in explaining the preferred manner in which the correct textures are applied to areas of the image, and created on the monitor.

Figure 4B:
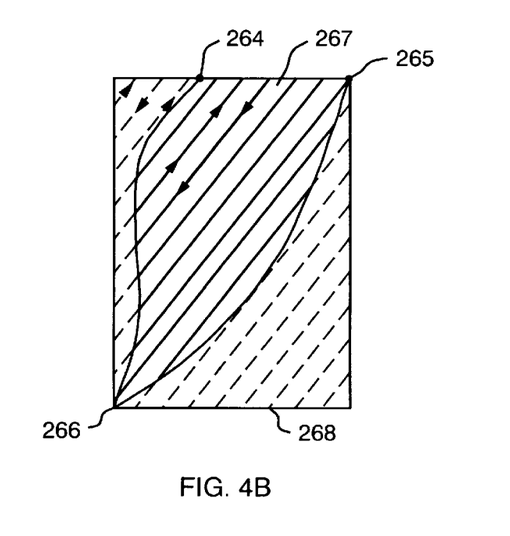
FIG. 4B is an enlarged schematic view of a portion of FIG. 4A, illustrating the path of the icon which simulates the creation of the mock image in the preferred embodiment of the method of this invention.

Presuming that artist number 1 has been selected by the user, textures 121–125 are available for use. As described above, the computer has previously been programmed to substitute one of textures 121–125 for different portions of the grey scale spectrum of the electronically-stored image. The creation of the mock image on the monitor is accomplished as follows, with reference to FIGS. 4A and 4B. Operation begins at the center 261 of image area 250. A pointer (not displayed) is effectively moved diagonally down to the right along path 263 from center 261 at 45° from the horizontal, until the first pixel having a grey scale value in the range of the first texture (texture 121 when artist number 1 has been selected) is encountered. The procedure can start with any one of the textures, and does not have to proceed from lightest to darkest as will be explained below. This first pixel is illustrated as pixel 264 of contiguous image area 262 having pixels with grey scale values in the selected range. The pointer is then caused to move horizontally to the right until it stops encountering pixels in the grey scale range for the selected texture 121. This last contiguous point having a grey scale in that range is labelled 265 in the drawing. The pointer then drops down to the next row of pixels and traverses horizontally to the left, continuing until it hits the last contiguous pixel having a grey scale value in the selected range. From that point, the pointer again drops down and traverses to the right. Operation continues in this fashion until no more adjacent pixels having the correct grey scale value are found, labelled point 266 in the drawing. The software then draws a virtual rectangle around area 267 which has been traversed, with the first point establishing the upper side of the rectangle, the last point establishing the lower side, and the right most and left most points establishing the right and left side of the rectangle, respectively. By this fashion, portion 267 of larger area 262 composed entirely of pixels having grey scale values in the selected range is identified. This area 267, and virtual rectangle 268, are shown enlarged in FIG. 4B.

The software then accomplishes the gradual display of area 267 on the computer output device. This is accomplished as follows, with reference to FIG. 4B. The drawing icon is positioned on the screen so that the end of the drawing implement is at the upper left hand corner of rectangle 268. The icon is then moved back and forth across diagonal lines shown by the broken lines in FIG. 4B. When a side of rectangle 268 is encountered, the pointer moves one pixel to the right or down, as appropriate, reverses direction, and traverses again. The end result is that the icon moves diagonally up and down across the entire area of rectangle 268, imitating the diagonal movement of the drawing implement which may be accomplished by an artist filling in an area with a particular texture. When the icon encounters pixels within area 267 which is to be shaded with the texture chosen to represent the grey scale range of the pixels within area 267, the software enables the monitor to display the texture along the path which the icon traverses. This displayed texture is indicated by the solid lines within area 267. The result is the application of the scanned texture to area 267 in a gradual fashion filling from the top left hand corner to the bottom right hand corner of rectangle 268. To an observer, this process appears as though the icon is drawing the texture in area 267, filling from the top left to the bottom right of the area being drawn, and leaving appropriate drawing lines which create the texture. This embodiment simulates a drawing process by a right handed artist. To simulate a left handed artist, the filling of the texture would be from the top right to the bottom left.

Once the displayed portion 267 is accomplished, the pointer moves to the top left hand corner of rectangle 268 and proceeds diagonally up along path 269 (parallel to path 263) until it encounters another pixel having a grey scale value in the selected range, labelled pixel 272, FIG. 4A. Since the pointer is moving up, the horizontal traversing which identifies area 271 to which will be applied the selected texture proceeds left to right and up, in the same fashion described below for area 267. Area 271 and encompassing rectangle 276 are created in the same fashion, and area 271 is filled with display texture in the same fashion as described below in relation to area 267. When display area 271 has been created, the pointer moves to the bottom right hand corner of rectangle 276 and proceeds diagonally downward to the right until it hits the next pixel having a grey scale value in the selected range. Operation proceeds in this fashion until each pixel in image 260 having a grey scale value in the selected range has been displayed on the monitor with the appropriate texture. Each of the other textures would then be applied to the image in the same fashion. The end result is that the icon moves across display 250 in an interesting and apparently somewhat random fashion, filling in small or large areas with different textures, until the entire image is created. Although in software image 260 can be created in mere seconds, the icon is typically enabled to move at a relatively slow speed such that most images take minutes to create, which accomplishes the entertainment value associated with the invention.

Figure 5:
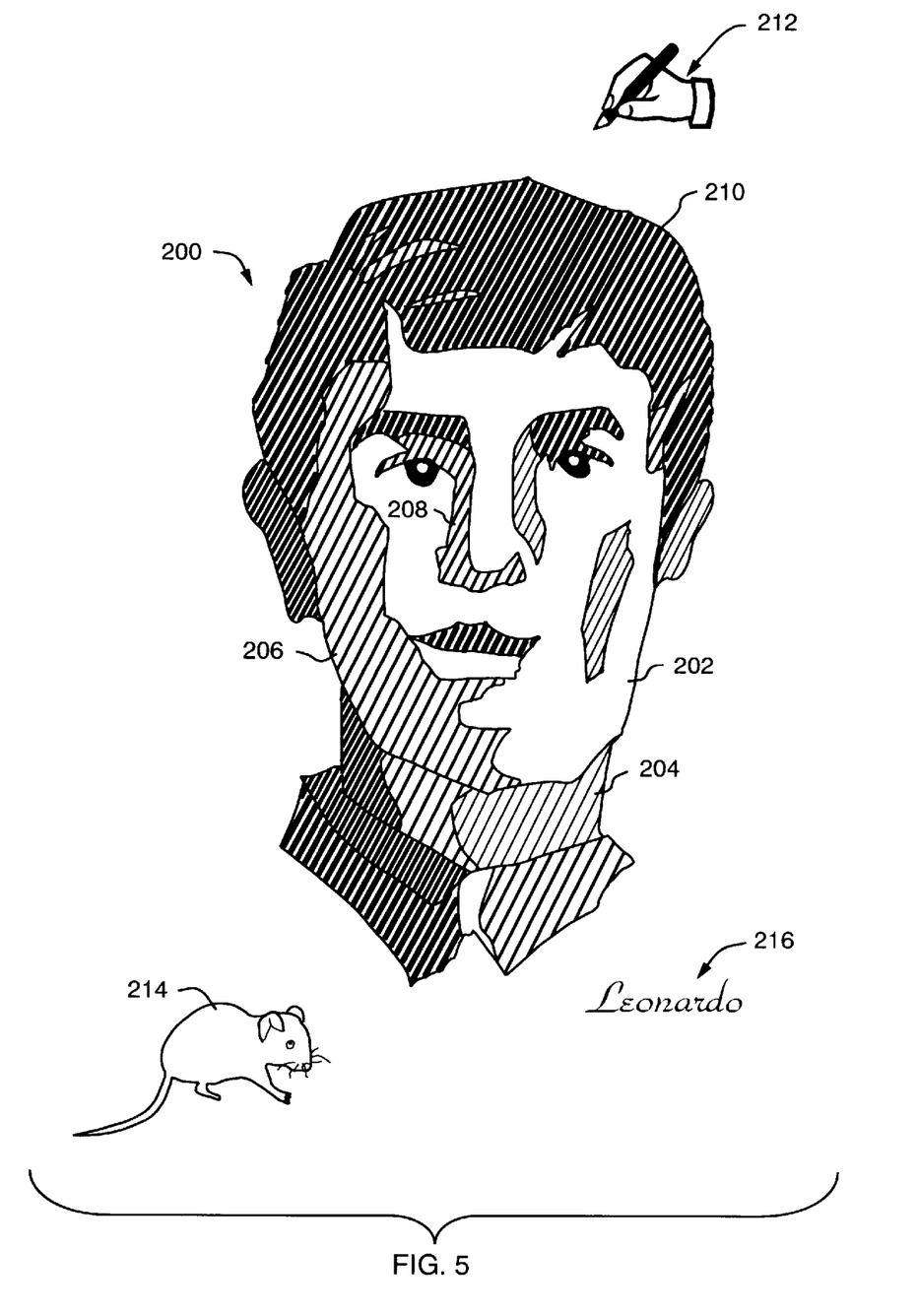
FIG. 5 is a simplified example of the monitor of FIGS. 1 and 2 during or just at the completion of the creation of the mock artist drawing or painting according to the method of this invention.

A simplified form of a completed portrait image 200 is shown in FIG. 5. Image 200 has area 202 with the lightest texture, area 204 with the next darkest texture, area 206 with the next darkest texture, area 208 with the next darkest texture, and area 210 with the darkest texture. The software can also create on the output artist's "signature" 216, which helps to personalize the output. The signature is associated with the user-selected artist style and drawing icon. Also displayed in image 200 is drawing icon 212 which in this case is an artist's hand holding a pencil. Also displayed is observer icon 214 which could be an animal or a person, for example. Observer icon 214 may be placed to increase the entertainment value of this invention. Icon 214 is meant to simulate observers whom often observe and comment on live drawings by artists. Observer icon 214 can be simulated to make comments as the drawing is created, for example "you have captured the eyes well". In another embodiment, observer 214 can appear to reach up and make a mark on image 200. The drawing icon could then be enabled to appear to say "sorry about that", and produce an eraser and erase the mark, then continue with the drawing. There are endless possibilities for interaction between the drawing icon, the observer icon, and the actual observers of the process, limited only by the creative abilities of the programmer.

As a result, each portrait, and the process by which it is "created" on the monitor, is unique. There is thus entertainment value to the process. Any video clip of the process will be a unique cartoon movie, which has value. The video clip for each portrait will have a different duration, and the path the icon follows will be unique, because it is dependent on the shading of a particular portrait. Also, the observer icon comments can be selected randomly from a library of hundreds of different expressions. The time at which such comments are inserted into the drawing process may also be randomized.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of simulating the creation of a mock artist's drawing or painting image on a computer monitor integrated into a vending machine, from an electronically-stored image, comprising:

providing a means for accepting monetary payment;

electronically storing a plurality of display textures for use in creating the mock image, wherein said mock artist has a predetermined style, and wherein said stored display textures correspond to said predetermined style of said mock artist;

creating a plurality of visible textures corresponding to said predetermined style of said mock artist;

activating said vending machine in response to said means for accepting monetary payment;

translating the electronically-stored image into computer instructions capable of creating the mock image;

generating and displaying on the monitor an icon which simulates drawing or paining the mock image; and using said instructions to move said icon about the monitor, wherein the mock image is created gradually as said icon moves, to simulate the process by which an artist may create the mock image.

2. The method of claim 1 in which the translating step includes determining a display parameter value of pixels of the electronically-stored image.

3. The method of claim 2 in which the translating step further includes dividing the determined display parameter values into groups.

4. The method of claim 3 in which said groups represent contiguous portions of a digital grey scale spectrum.

5. The method of claim 1 in which the translating step includes substituting said stored display textures for portions of the electronically-stored image.

6. The method of claim 5 in which the using step includes displaying on said monitor said substituted display textures in the areas of the display corresponding to said substituted portions of the electronically-stored image.

7. The method of claim 1 in which electronically storing a plurality of display textures includes scanning said created textures into a computer memory.

8. The method of claim 7 in which displaying on said monitor said substituted display textures includes gradually creating on said monitor said substituted display textures.

9. The method of claim 8 in which gradually creating said substituted display textures includes moving said icon across said monitor in a predetermined movement pattern.

10. The method of claim 9 in which said predetermined movement pattern is accomplished in one area of the display corresponding to said substituted portions of the electronically-stored image at a time.

11. The method of claim 9 in which gradually creating on said monitor said substituted display textures includes creating said display textures along the path on which said icon traverses the monitor, as said icon traverses the monitor.

12. The method of claim 1 in which the step of generating and displaying an icon includes providing and displaying a plurality of drawing icons, and providing a means for a user to select one said drawing icon.

13. The method of claim 1 in which said instructions capable of creating said mock image include division of said electronically-stored image into a plurality of separate image areas, each said image area corresponding generally to contiguous image areas of approximately the same display parameter value.

14. The method of claim 13 in which using said instructions to move said icon across the monitor includes moving said icon across said monitor in a predetermined movement pattern.

15. The method of claim 14 in which said predetermined movement pattern is accomplished in said plurality of separate image areas, one said image area at a time.

16. A method of simulating the creation of a mock artist's drawing or painting image on a computer monitor which is integrated into a vending machine, from an electronically-stored image, comprising:

providing a means for accepting monetary payment;

activating said vending machine in response to said means for accepting monetary payment;

electronically storing a plurality of display textures for use in creating the mock image, wherein said mock artist has a predetermined style and wherein said stored display textures correspond to said predetermined style of said mock artist;

translating the electronically-stored image into computer instructions capable of creating said mock image using said display textures corresponding to said predetermined style of said mock artist, including determining a display parameter value for the pixels of the electronically-stored image, and dividing the determined values into groups, in which said groups represent contiguous portions of a display parameter scale spectrum, and in which the translating step further includes substituting said stored display textures, corresponding to said mock artist, for portions of the electronically-stored image;

generating and displaying on the monitor an icon which simulates drawing or painting the mock image; and using said instructions to move said icon about the monitor, wherein the mock image is created gradually as said icon moves, to simulate the process by which an artist may create the mock image.

17. A method of simulating the creation of a mock artist's drawing or painting image on a computer monitor which is integrated into a vending machine, from an electronically-stored image, comprising:

electronically storing a plurality of display textures for use in creating the mock image, wherein said mock artist has a predetermined style and wherein said stored display textures correspond to said predetermined style of said mock artist;

translating the electronically-stored image into computer instructions capable of creating said mock image using said display textures corresponding to said predetermined style of said mock artist, including determining the grey scale value of pixels of the electronically-stored image, dividing the determined grey scale values into groups, dividing said electronically-stored image into a plurality of separate image areas, each said image area corresponding generally to contiguous image areas of approximate the same display parameter value, and in which the translating step further includes substituting said stored display textures for portions of the electronically-stored image;

generating and displaying on the monitor an icon which simulates drawing or painting the mock image; and using said instructions to move said icon about the monitor, wherein the mock image is created gradually as said icon moves, to simulate the process by which an artist may create the mock image, including displaying on said monitor said substituted display textures in the areas of the display corresponding to said substituted portions of the electronically-stored image, and in which displaying on said monitor said substituted display textures includes gradually creating on said monitor said substituted display textures, and in which gradually creating said substituted display textures includes moving said icon across said monitor in a predetermined movement pattern, in which said predetermined movement pattern is accomplished in one area of the display corresponding to said substituted portions of the electronically-stored image at a time, and further in which gradually creating on said monitor said substituted display textures includes creating said display textures along the path on which said icon traverses the monitor, as said icon traverses the monitor.

18. A method of simulating the creation of a mock artist's drawing or painting image on a computer monitor which is integrated into a vending machine, from an electronically-stored image, comprising:

provensor a means for accepting monetary payment;

activating said vending machine in response to said means for accepting monetary payment;

providing a grey scale divided into groups;

selecting a mock artist having a predetermined artistic style:

providing one or more store textures corresponding to said selected mock artist's style, wherein each texture corresponds to one or more of said divided grey scale groups;

translating the electronically-stored image into computer instructions capable of creating said mock image, comprising the steps of, determining a grey scale value for each of a plurality of pixels of said stored image:

searching one or more portions of said stored image for grey scale values corresponding to said one or more of said divided grey scale groups substituting said stored display textures corresponding to said selected mock artist's style and to said divided grey scale groups for those grey scale values, corresponding to said grey scale groups, which were found in said searching step in said electronically-stored image;

using said instructions to gradually create the mock image on the monitor, in separate discrete portions of the monitor one at a time, simulate the process by which an artist may create the mock image.

19. A photography booth for creating printed output of a mock artist's drawing or painting image, comprising:

a means for accepting monetary payment for creating said printed output;

a printer;

a computer with memory;

means for storing a customer-provided image in said computer memory;

means for selecting a mock artist having a predetermined artistic style:

means for storing a plurality of drawing textures corresponding to said selected mock artist's predetermined artistic style;

means for substituting one or more of said stored textures for different areas of said stored image to create an electronic mock artist's drawing or painting image corresponding to said selected artist's predetermined artistic style; and means for providing said electronic mock artist's image to said printer, to print said mock artist's image.

20. A photography booth for creating an output of a mock artist's drawing or painting image, comprising:

a means for accepting monetary payment for creating said output;

a computer with memory;

means for selecting a mock artist having a predetermined artistic style:

means for storing a plurality of drawing textures corresponding to said selected mock artist's predetermined artistic style;

means for substituting one or more of said stored textures for different areas of said stored image to create an electronic mock artist's drawing or painting image corresponding to said selected artist's predetermined artistic style; and means for creating a stored version of said mock artist's image or said electronic mock artist's image on a portable machine-readable memory device, and delivering it to the user as a record of said image.

21. The booth of claim 20 further including a hard copy output device, and means for providing said electronic mock artist's image to said output device, to create a hard copy of said mock artist's image.

22. The booth of claim 20 further including a monitor, and means for displaying on said monitor a gradual process of creating said mock image.

23. The booth of claim 22 further including means for creating a stored version of said gradual process on a portable, machine-readable memory device.

24. The booth of claim 23 further including means for dispensing to the user said portable, machine-readable memory device.

25. The booth of claim 21 further including means for dispensing to the user said hard copy.

26. The booth of claim 21 in which said hard copy output device is a computer printer, an engraver, or an etcher.

* * * * *

UNITED STATES PATENT AND TRADEMARK OFFICE
CERTIFICATE OF CORRECTION

PATENT NO.   : 6,021,417
DATED        : February 1, 2000
INVENTOR(S)  : Massarsky, Yefim It is certified that error appears in the above-identified patent and that said Letters Patent is hereby corrected as shown below:

On the title page item [54], and column 1, line 1,
    Method of Simulating the Creation of an Artist's Drawing or
    Painting, and Device for Accomplishing Same

[75]    Inventor: Yefim Massarsky, Newton, Mass.

Signed and Sealed this

Thirtieth Day of January, 2001

Q. TODD DICKINSON

*Attest:*

*Attesting Officer*    *Director of Patents and Trademarks*